Nov. 3, 1936.   E. S. HOUCK   2,059,353
PIE CRIMPER
Original Filed Nov. 8, 1935   2 Sheets-Sheet 1

Inventor
E. S. Houck

By Clarence A. O'Brien
Attorney

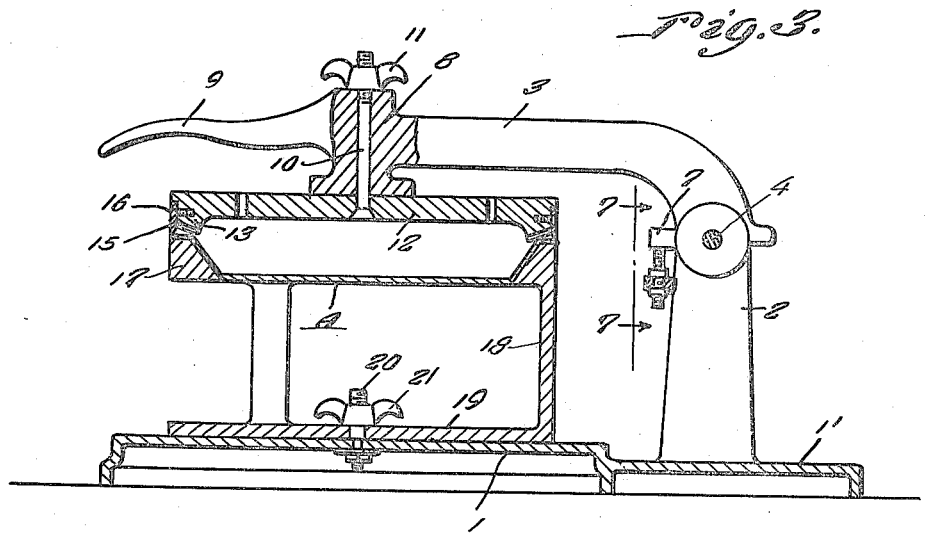
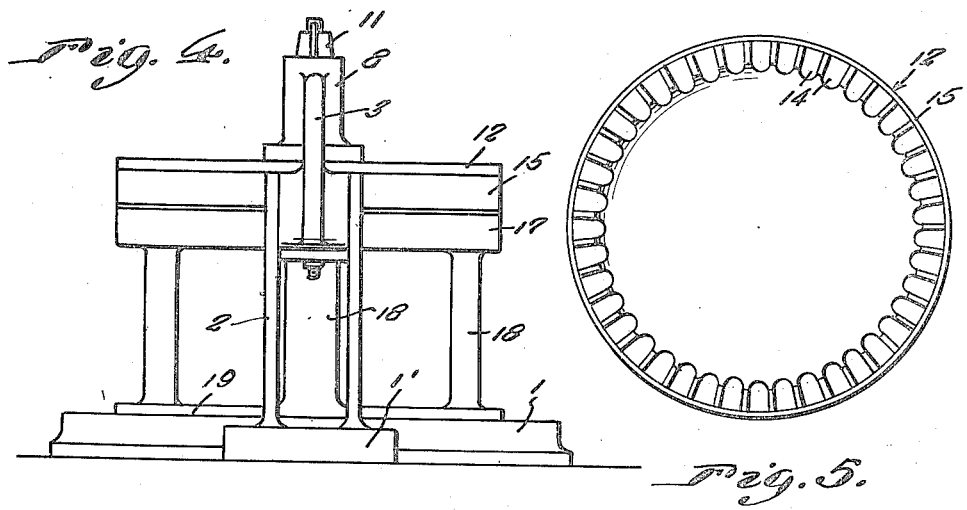
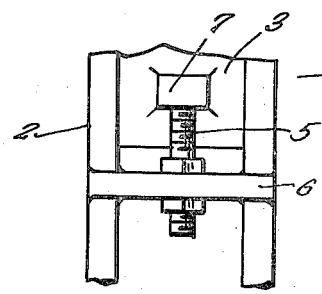

Patented Nov. 3, 1936

2,059,353

UNITED STATES PATENT OFFICE 2,059,353

PIE CRIMPER

Elmer S. Houck, York, Pa.

Application November 8, 1935, Serial No. 48,909
Renewed September 24, 1936

1 Claim. (Cl. 107—49)

This invention relates to a device for crimping pies and for cutting surplus dough from the periphery of the pie pan, the general object of the invention being to provide a holder for the pie pan, means for detachably connecting the holder to a base so that different sizes of holders can be attached to the base and a lever supported from the base and detachably supporting a crimping and cutting member so that different sizes of said members can be attached to the lever to suit the sizes of the pies to be operated upon.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 3 is a vertical sectional view with parts in elevation.

Figure 4 is a front view.

Figure 5 is a view of the die for crimping the pie.

Figure 7 is a section on the line 7—7 of Figure 3.

Figure 1:
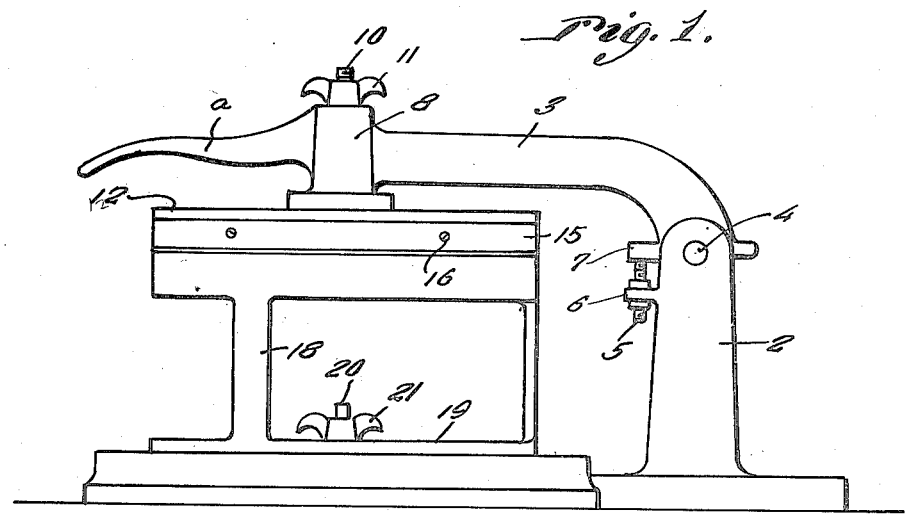
Figure 1 is an elevation of the device.
Figure 2:
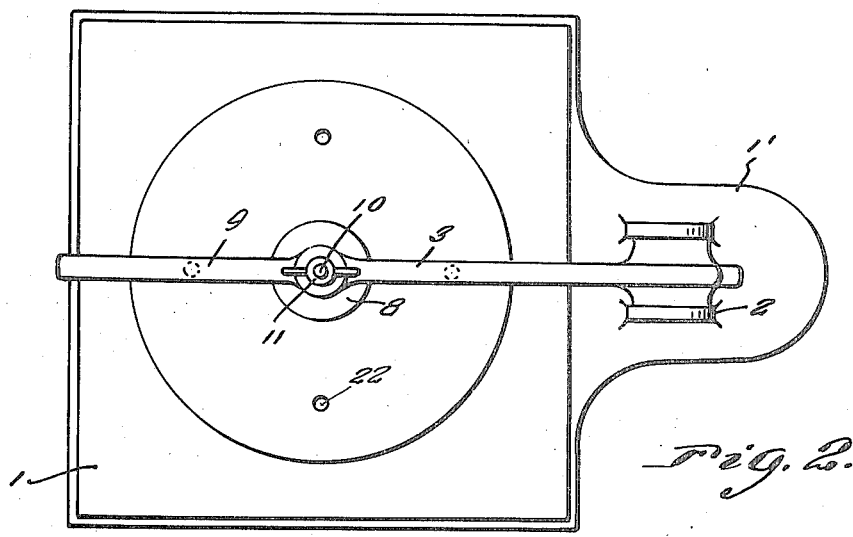
Figure 2 is a top plan view thereof.

In these views the numeral 1 indicates a base having an extension 1' from which rises the post 2. The downwardly curved rear end of a lever or arm 3 is pivoted to the top of the post as shown at 4 and downward movement of the arm or lever is limited by an adjustable screw stop 5 carried by a cross bar 6 of the post engaging a projection 7 on the arm.

The front end of the arm is formed with a vertical enlargement 8 to which a forwardly extending handle 9 is connected, the handle facilitating raising and lowering of the arm or lever. The enlargement 8 is formed with a vertical bore for receiving a bolt 10 having a thumb nut 11 threaded on the upper end, the bolt acting to hold the combined crimper and cutter member 12 to the lower end of the enlargement 8. This member 12 is of circular shape and has a downwardly extending ring 13 on the periphery of its underface the lower edge of which is formed with the depressions and recesses which form the crimping parts 14. A ring-shaped knife 15 is embedded in a recess formed in the periphery of the member 12 and has its cutting edge extending beyond the crimping parts 14, this ring being held in place by the countersunk screws 16. Thus this member 12 forms a combined die for crimping the edges of the pie and a cutter for cutting the surplus dough from the periphery of the pie.

The pie pan containing the pie is shown at A and fits in an annular member 17 which is shaped to receive the pan and this annular member is provided with the legs 18 which are secured to a base 19 adapted to rest on the base 1 and to be secured thereto by the bolt 20 and the thumb nut 21.

As it will be seen the holder holds the pan with the pie therein in position where the edges of the pie will be engaged by the parts 14 and the member 12 as the lever or arm 3 is swung downwardly so that the edges of the pie will be crimped and at the same time the ring-knife 15 will cut surplus dough from the periphery of the pie. The ring part 13 forms a recess so that the major part of the member 12 is spaced from the top of the pie, and ports 22 are formed in the member 12 and communicate with the recess to permit air to escape and to prevent the member 12 from damaging the pie.

Figure 6:
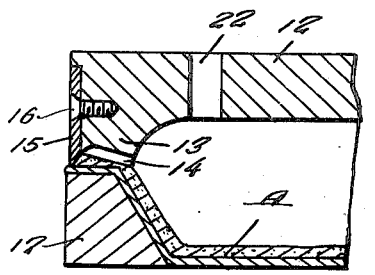
Figure 6 is a fragmentary vertical sectional view showing how the crimping and cutting member engages the periphery of the pie.

As will be seen from Figure 6, the depressions of the crimping parts 14 terminate at their outer ends short of the knife 15, and these ends are rounded. This arrangement, with the air chamber and the ports 22, acts to release the dough from the die after the pie is crimped.

As before stated, the pie pan holder and the die member are removably attached to their supporting parts and by providing holders and die members of different sizes for use with the device, said device can be used for operating upon different sizes of pies.

It is thought from the foregoing description that the advantages and novel features of the invention will be readily apparent.

It is to be understood that changes may be made in the construction and in the combination and arrangement of the several parts, provided that such changes fall within the scope of the appended claim.

What is claimed is:—

A device of the class described comprising a base, a pie pan holder including a holder part, legs depending therefrom and a base, means for detachably connecting the base of the holder to the first-mentioned base, a post rising from the first-mentioned base, a flange on said post, an adjustable set screw in said flange, a lever pivotally connected with the upper end of the post, a flange on said lever adapted to abut said set screw for limiting the downward movement of said lever, a combined crimping and cutting member detachably connected with the free end of the lever, a handle connected with the free end of the lever, whereby by swinging the lever downwardly the combined die and cutter member will crimp the edges of a pie and cut surplus dough from the edges of the pie.

ELMER S. HOUCK.